United States Patent
Aher et al.

(10) Patent No.: US 11,889,167 B2
(45) Date of Patent: Jan. 30, 2024

(54) SYSTEMS AND METHODS FOR DISPLAYING INTERACTIVE CONTENT ITEM FOR A PREDETERMINED DURATION

(71) Applicant: Rovi Guides, Inc., San Jose, CA (US)

(72) Inventors: Ankur Aher, Maharashtra (IN); Sandeep Jangra, Bengaluru (IN); Aman Puniyani, Bangalore (IN); Mohammed Yasir, Bengaluru (IN)

(73) Assignee: Rovi Guides, Inc., San Jose, CA (US)

( * ) Notice: Subject to any disclaimer, the term of this patent is extended or adjusted under 35 U.S.C. 154(b) by 78 days.

(21) Appl. No.: 17/466,077

(22) Filed: Sep. 3, 2021

(65) Prior Publication Data

US 2021/0400360 A1  Dec. 23, 2021

Related U.S. Application Data

(63) Continuation of application No. 16/456,486, filed on Jun. 28, 2019, now Pat. No. 11,140,463.

(51) Int. Cl.
*H04N 21/8545* (2011.01)
*H04N 21/8405* (2011.01)
*H04N 21/845* (2011.01)

(52) U.S. Cl.
CPC ..... *H04N 21/8545* (2013.01); *H04N 21/8405* (2013.01); *H04N 21/8456* (2013.01)

(58) Field of Classification Search
CPC .......... H04N 21/8545; H04N 21/8405; H04N 21/8456; H04N 21/25891; H04N 21/26233; H04N 21/2668; H04N 21/8541
See application file for complete search history.

(56) References Cited

U.S. PATENT DOCUMENTS

| | | |
|---|---|---|
| 6,654,933 B1 | 11/2003 | Abbott et al. |
| 10,063,927 B1 | 8/2018 | Singh et al. |
| 2002/0053078 A1* | 5/2002 | Holtz ................. H04N 21/4782 348/E5.022 |
| 2003/0220100 A1 | 11/2003 | McElhatten et al. |
| 2007/0283381 A1 | 12/2007 | Sidi et al. |
| 2008/0109727 A1 | 5/2008 | Colle et al. |
| 2015/0074732 A1 | 3/2015 | Green et al. |
| 2017/0134776 A1* | 5/2017 | Ranjeet ................ G11B 27/031 |
| 2017/0262458 A1 | 9/2017 | Kodam et al. |

* cited by examiner

*Primary Examiner* — Oschta I Montoya
(74) *Attorney, Agent, or Firm* — Haley Guiliano LLP

(57) ABSTRACT

Systems and methods are provided for presenting an interactive content item matching a user-selected category to a user for a desired duration. A user selects a category and selects a first interactive content item on a media system. The system calculates a total duration of a storyline from the selected interactive content item that matches the selected category (e.g., a genre "comedy") and compares the calculated duration to a desired predetermined duration for which the user wishes to watch the selected show. If the system determines, for instance, that the total duration of the selected storyline is less than the predetermined duration, the system identifies scenes from another show and interleaves them with scenes from the first interactive content item to generate a combined interactive content item that satisfies the user viewing preferences.

18 Claims, 9 Drawing Sheets

SYSTEMS AND METHODS FOR DISPLAYING INTERACTIVE CONTENT ITEM FOR A PREDETERMINED DURATION

CROSS-REFERENCE TO RELATED APPLICATIONS

This application is a continuation of U.S. patent application Ser. No. 16/456,486, filed Jun. 28, 2019. The disclosure of which is hereby incorporated by reference herein in its entirety.

BACKGROUND

This disclosure is generally directed to displaying interactive content item. In particular, methods and systems are provided for displaying an interactive content item for a predetermined duration that matches a user-selected category.

SUMMARY

Computing devices such as smartphones, cellular phones, laptop computers, desktop computers, netbooks, tablet computers, etc., are commonly used for a variety of different purposes. Users often use computing devices to use, play, and/or consume digital media items (e.g., view digital images, watch digital video, and/or listen to digital music). A digital media item may be streaming content item or locally stored content item. Streaming content item (e.g., a streaming video) may be content item that is not stored locally on a computing device in advance, but rather, is presented to the user while being received from another computing device (e.g., a content item server). Locally stored content item may be content item that is stored in a local memory (e.g., a hard disk) of the computing device.

Digital media items such as digital videos (both streaming and local videos) often have fixed storylines. For example, a digital video may present a story (e.g., a storyline) to a user and the user may be able to only view this story, without being able to interact with the digital video (e.g., may not be able to provide user input), and the storyline or events that occur in the digital video may not be changeable (e.g., the storyline for a digital video is generally always the same).

More recently, content item producers have created digital videos with multiple storylines. A user viewing the digital video is presented with a number of user-selectable options, which assist the user in navigating through the multiple storylines. However, the user may select an option resulting in a storyline with a very short duration. For example, the digital video may present the user with multiple options. The user may, for instance, select the option that would result in a comedic storyline. However, if the digital video does not have a sufficient number of scenes directed to the genre of comedy, the storyline may restart and require the user to select alternative options directed to different genres. This results in a subpar viewing experience for users who are unable to watch the interactive digital video in the desired genre.

Accordingly, to overcome these problems, systems and methods are provided herein for displaying interactive content item for a predetermined duration that matches a user-selected category. In some embodiments, a user may select, from a list of interactive content items, each of which have a plurality of storylines directed to different genres, a first interactive content item and a desired category for the storyline. The system identifies, from the plurality of scenes belonging to the first interactive content item, a first set of scenes that match the selected category. If the system determines that the total duration of the first set of scenes matching the selected category is less than a predetermined content item duration (e.g., an amount of free time available to the user), the system identifies a second interactive content item having a second set of scenes that match the user-selected category. The system identifies scenes from the second interactive content item that match the user-selected category and interleaves them with the first set of scenes from the first interactive content item such that the total duration of the combined interactive content item matches the predetermined duration.

In some implementations, the system arranges the scenes from the second interactive content item to be in between the first set of scenes from the first interactive content item in the combined interactive content item generated for display. The system, when identifying the scenes from the second interactive content item, may retrieve metadata associated with each of the scenes comprising the second interactive content item. The retrieved metadata may include, for example, information related to a category or genre associated with the respective scene, one or more actors present within the respective scene, and/or one or more locations present within the respective scene. The system performs a comparison between the user-selected category and the retrieved metadata (e.g., the genre field) to identify scenes from the second interactive content item that match the user-selected category.

In some implementations, selecting a category for the user may involve selecting a genre of storyline that the user prefers to watch. For example, the system may display the title of the first interactive content item along with a listing of genres in which the first interactive content item may be presented. Upon selection of a genre by the user, the system generates for display, the selected storyline comprising of the first set of scenes that relate to the selected genre (e.g., comedy).

Once scenes from the second interactive content item matching the user-selected category are identified, the system may, in some implementations, select a subset of the identified scenes to integrate into the first set of scenes of the first interactive content item. Specifically, the system may consider the duration of each of the identified scenes from the second interactive content item and an amount of difference between the total duration of the first set of scenes and the predetermined duration. In some implementations, the system, when selecting the subset of the identified scenes from the second interactive content item, may consider the actors present in the respective scenes. For example, the system may select scenes from the second interactive content item that feature the same actors as the ones in the first set of scenes of the first interactive content item.

In some implementations, the system may identify the second subset of video segments of the second interactive content item associated with the selected category by retrieving metadata for each of a second plurality of video segments of the second interactive content item. The system determines category tag information indicative of a category with which the respective segment of the second plurality of video segments is associated from the retrieved metadata. The system then identifies, from the determined category tag information, the second subset of video segments having a category tag matching the selected category. In some implementations, the system selects the second interactive content item from a series to which the first interactive content item also belongs (e.g., different episodes of the series "Black Mirror").

The system, when interleaving the first subset of video segments and the second subset of video segments to create a combined interactive content item, arranges each of the video segments of the first subset of video segments and the second subset of video segments in a sequence to create a storyline matching the selected category. For instance, the system retrieves a first set of metadata for each of the first subset of video segments and identifies a first list of actors included in each of the first subset of video segments from the retrieved first set of metadata. The system further retrieves a second set of metadata for each of the second subset of video segments and identifies a second list of actors included in each of the second subset of video segments from the retrieved second set of metadata. Finally, the system arranges a segment of the second subset of video segments adjacent to a segment of the first subset of video segments in response to determining an overlap between the first list of actors included in the respective video segment of the first subset of video segments and the second list of actors included in the respective video segment of the second subset of video segments.

In this way, the system is able to present an interactive content item matching the user-selected category to the user for a desired duration. In contrast to other known systems of presenting interactive content items that require the user to select alternate storylines that do not match the selected category or that present storylines matching the selected category for a limited amount of time, methods and systems disclosed herein improve the content item consumption experience for the users by combining video segments from additional interactive content item that match the user-selected category.

DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems in accordance with the present disclosure are described herein for presenting an interactive content item matching a user-selected category to a user for a desired duration. For example, a user selects a category such as "comedy" and selects a first interactive content item, "Bandersnatch," on a media system. The system calculates a total duration of a storyline from the selected show "Bandersnatch" that matches the selected category (e.g., the genre "comedy") and compares the calculated duration to a desired duration for which the user wishes to watch the selected show. If the system determines, for instance, that the total duration of the scenes from "Bandersnatch" is less than 30 minutes, and the user's desired duration is longer, the system identifies scenes from another show (e.g., such as "Black Mirror") and interleaves them with scenes from "Bandersnatch" to generate a combined interactive content item that satisfies the user viewing preferences.

Figure 1:
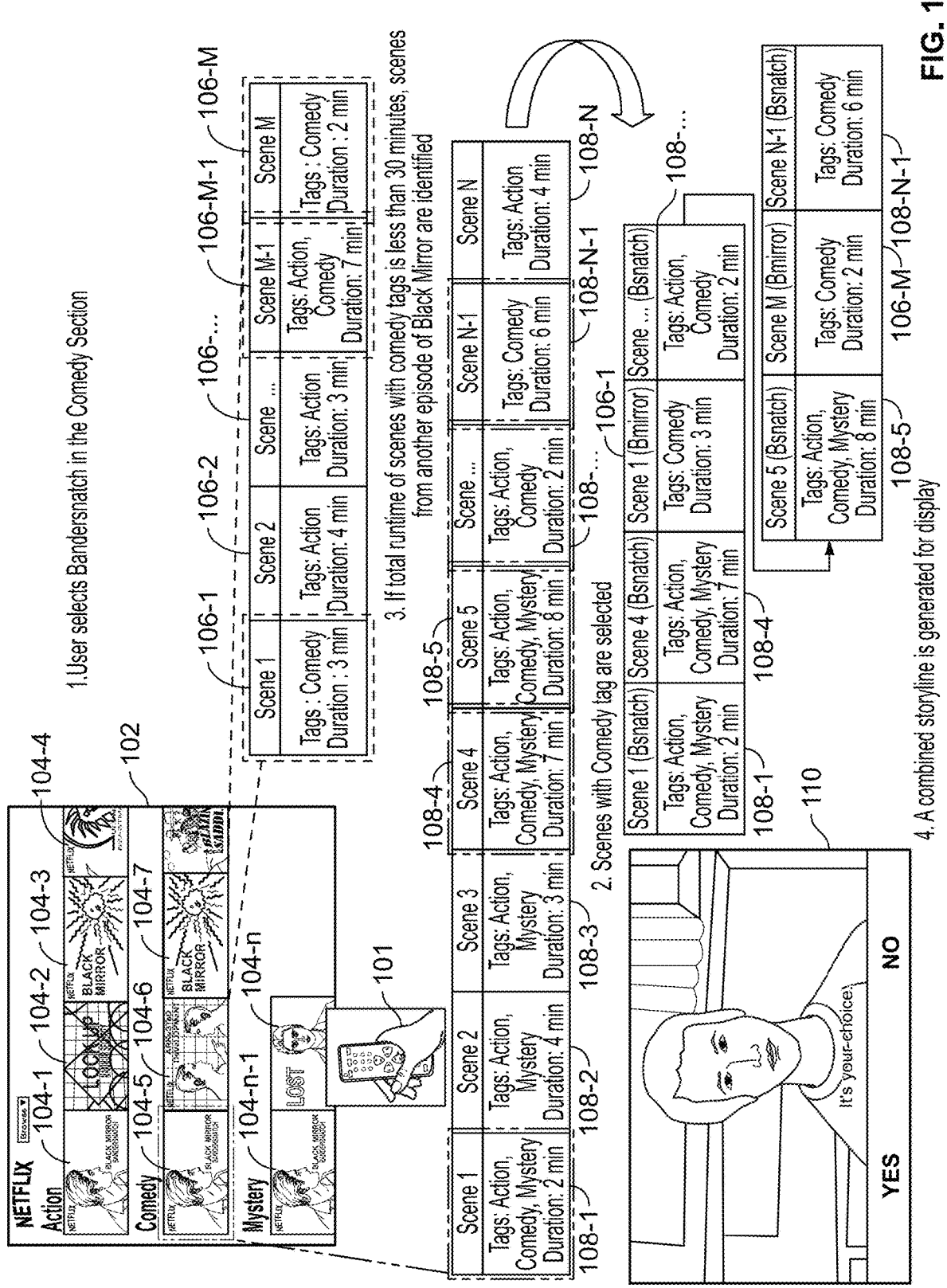
FIG. 1 shows an illustrative depiction of a system for generating a combined interactive content item, in accordance with some embodiments of the disclosure.

FIG. 1 shows an illustrative depiction of a system 100 for generating a combined interactive content item, in accordance with some embodiments of the disclosure. As illustrated in FIG. 1, user equipment device 102 displays a listing of available interactive content items 104-1, 104-2, 104-3, . . . , 104-n (collectively, 104) arranged in rows based on a corresponding genre associated with the respective storylines. For example, the show "Bandersnatch" may include a first storyline corresponding to the "Action" genre, a second storyline corresponding to the "Comedy" genre, and a third storyline corresponding to the "Mystery" genre. Accordingly, as shown in FIG. 1, the show "Bandersnatch" may be listed in multiple rows. Similarly, the show "Black Mirror" may include a first storyline corresponding to the "Action" genre and a second storyline corresponding to the "Comedy" genre. Additional details about the multiple storylines for the same show are provided below in connection with the discussion of FIG. 7.

As further illustrated in FIG. 1, each of the available interactive content item 104 comprises of a plurality of video segments. For example, interactive content item 104-7 comprises video segments 106-1-106-M (collectively, 106) as shown in FIG. 1. Similarly, interactive content item 104-5 comprises of video segments 108-1-108-N (collectively, 108) as shown in FIG. 1. Each of the plurality of video segments 106, 108 corresponds to a scene of the respective shows. Moreover, each video segment 106, 108 has metadata associated with the respective scenes, including information relating to the duration of the respective scenes and one or more category tags associated with the respective scenes. For example, as illustrated in FIG. 1, video segment 108-1 of interactive content item 104-5 comprises a first scene of the show "Bandersnatch" and includes the category tags of "Action," "Comedy," and "Mystery," while video segment 108-2 interactive content item 104-5 comprises a second scene of the show "Bandersnatch" and includes the category tags of "Action" and "Mystery." Additional details with regard to the metadata associated with the respective scenes are provided in greater detail below in connection with the discussion of FIG. 5.

The system generates different storylines for the show "Bandersnatch" using the metadata and more specifically, the stored category tag information indicating the genres with which each scene of the interactive content item is associated. For instance, a storyline corresponding to the "Comedy" genre for the show "Bandersnatch" (i.e., interactive content item 104-5) would include video segment 108-1 but omit video segment 108-2. Similarly, a storyline corresponding to the "Mystery" genre for the show "Bandersnatch" (i.e., interactive content item **104-*n*-1) would include video segments 108-1-108-5 but omit video segments 108-N-1 and 108-N**.

User 101 selects an interactive content item 104 from the available options displayed on user equipment device 102 as illustrated in FIG. 1. For example, user 101 may be in the mood to watch a comedy and use a remote-control device to select interactive content item 104-5—the show "Bandersnatch" with the storyline corresponding to the "Comedy" genre—from the available options. The system retrieves the metadata information corresponding video segments 108-1-108-N to identify one or more scenes from the show "Bandersnatch" that are associated with the genre "Comedy." As illustrated in FIG. 1, the system identifies a first subset of video segments (i.e., video segments 108-1, 108-4, 108-5, 108- . . . , and 108-N-1 of first interactive content item 104-5) corresponding to the genre of "Comedy" (based on retrieved metadata including the category tag of "Comedy"). Next, the system calculates a total duration of the identified first subset of video segments. For instance, in the example illustrated in FIG. 1, the system computes a total duration of all the segments corresponding to the genre of "Comedy" to be 25 minutes (video segments 108-1 (2 minutes), 108-4 (7 minutes), 108-5 (8 minutes), 108- . . . (2 minutes), and 108-N-1 (6 minutes)).

The system then compares the calculated duration (i.e., 25 minutes) to a desired predetermined content duration. For example, the system may review the user's schedule and determine that the user 101 has approximately 30 minutes to watch the interactive content. In response to determining that the calculated duration (25 minutes) is less than the desired predetermined content duration (30 minutes), the system identifies a second interactive content item to borrow content from to interleave with the user-selected interactive content. In the example illustrated in FIG. 1, when the storyline corresponding to the "Comedy" genre for user-selected interactive content item 104-5 is determined to have a duration less than the desired predetermined content duration, the system selects a second interactive content item (i.e., interactive content item 104-7). The system identifies a second subset of video segments from the second interactive content item (i.e., video segments 106-1, 106-M-1, and 106-M of interactive content item 104-7), which match the user-selected category (i.e., the genre "Comedy").

Finally, the system interleaves the second subset of video segments (i.e., video segments 106-1, 106-M-1, and 106-M of interactive content item 104-7) with the first subset of video segments (i.e., video segments 108-1, 108-4, 108-5, 108- . . . , and 108-N-1 of first interactive content item 104-5) in order to generate a combined interactive content item 110, which has a total duration matching the desired predetermined duration. Specifically, the system selects video segments 106-1 and 106-M from the second interactive content item 104-7, which have a total duration of 5 minutes, to be interleaved with the first subset of video segments (i.e., video segments 108-1, 108-4, 108-5, 108- . . . , and 108-N-1 of first interactive content item 104-5), which have a duration of 25 minutes for a total combined duration of 30 minutes. Combined interactive content item 110 is then generated for display on user equipment device 102 for user 101.

In this manner, the system is able to present to user 101 an interactive content item matching the user-selected category for a desired duration. Specifically, the system automatically displays interactive content item for the desired duration without requiring multiple inputs from the user, as is often required in the existing methods and systems.

Figure 2:
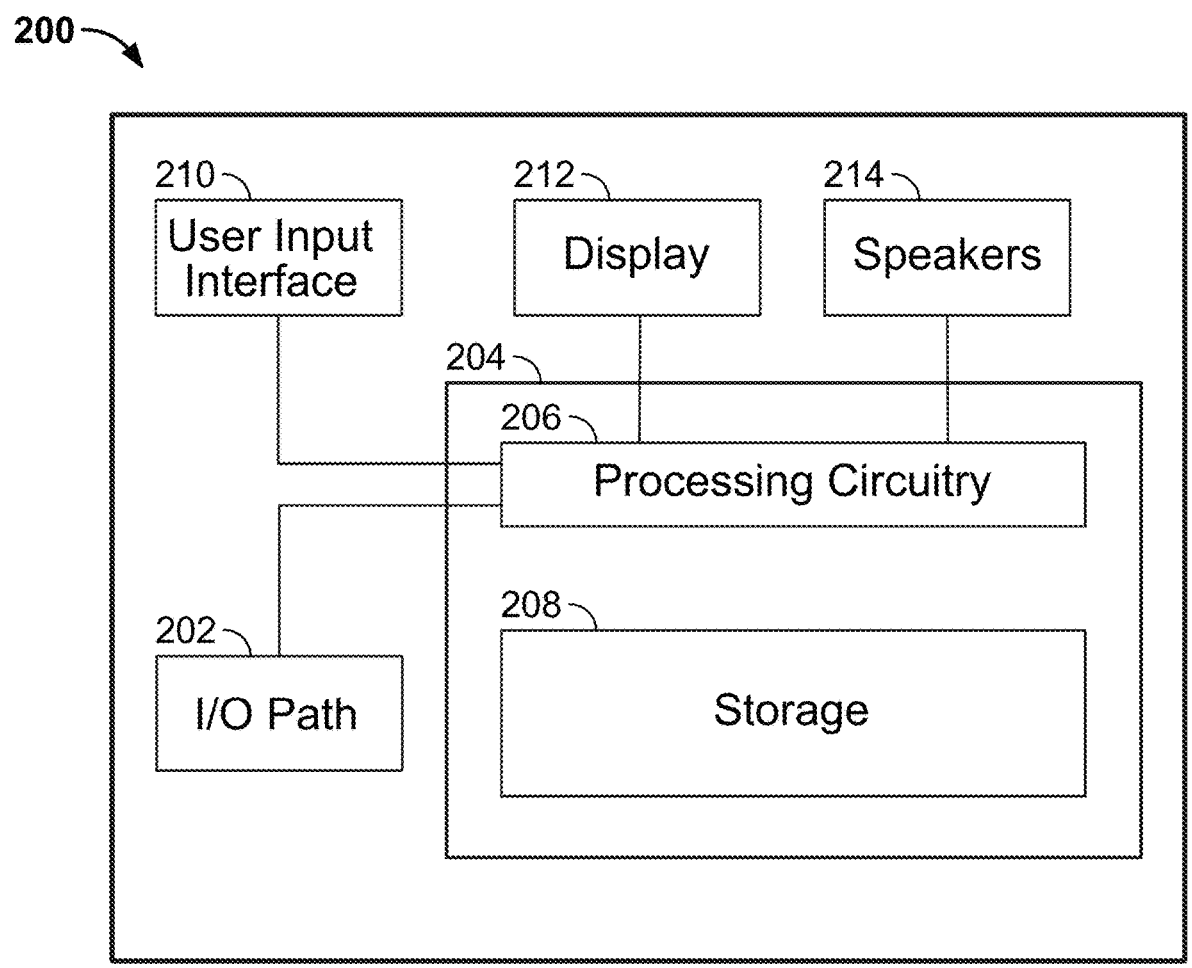
FIG. 2 is a block diagram of an illustrative media system, in accordance with some embodiments of the disclosure.

FIG. 2 depicts a generalized embodiment of an illustrative device (e.g., user equipment device 102) that displays an interactive content item. User equipment device 200 may be any of a plurality of user devices such as a smartphone, a tablet, personal computer, set-top box, etc. (discussed further below with respect to FIG. 3). User equipment device 200 may receive the interactive content item and data via input/output (hereinafter "I/O") path 202. I/O path 202 may provide the interactive content item (e.g., on-demand programming, Internet content item, content item available over LAN or WAN, and the like) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below in relation to FIG. 3). I/O functions may be provided by one or more of these communications paths but are shown as a single path in FIG. 2 to avoid overcomplicating the drawing.

Control circuitry 204 may be based on any suitable processing circuitry such as processing circuitry 206. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 204 executes instructions for an application stored in memory (e.g., memory 208). Specifically, control circuitry 204 may be instructed by a media application to perform the functions discussed above and below. For example, the media application may provide instructions to control circuitry 204 to generate the interactive content item corresponding to the "Comedy" genre. Moreover, the media application may also collect user preference information and calculate the desired predetermined duration. In some implementations, any action performed by control circuitry 204 may be based on instructions received from the media application.

Control circuitry 204 may include tuning circuitry, such as one or more analog tuners, one or more MP3 decoders or other digital decoding circuitry, or any other suitable tuning or audio circuits or combinations of such circuits. Encoding circuitry (e.g., for converting analog or digital signals to signals for storage in storage 208) may also be provided. Control circuitry 204 may also include scaler circuitry for upconverting and downconverting content item into the preferred output format of user equipment device 200, and converter circuitry for converting between digital and analog signals. The tuning and encoding circuitry may be used by user equipment device 200 to receive, play, and buffer content item. The circuitry described herein, including for example, the tuning, audio generating, encoding, decoding, encrypting, decrypting, scaler, and analog/digital circuitry, may be implemented using software running on one or more general purpose or specialized processors. If storage 208 is provided as a separate device from user equipment device 200, the tuning and encoding circuitry may be associated with storage 208.

Storage 208 may be any device for storing electronic data, such as random-access memory, solid state devices, quantum storage devices, hard disk drives, non-volatile memory or any other suitable fixed or removable storage devices, and/or any combination of the same. Control circuitry 204 may allocate portions of storage 208 for various purposes such as caching application instructions, recording media assets, storing portions of a media asset, buffering segments of media, etc. As described herein, storage 208 may be used to store one or more LUTs storing a number of MAC addresses associated with a plurality of user equipment devices and their corresponding profile information.

A user may send instructions to control circuitry 204 using user input interface 210. User input interface 210 may be any suitable user input interface, such as a remote control as shown in FIG. 1, mouse, trackball, keypad, keyboard, touch screen, touchpad, stylus input, joystick, voice recognition interface, or other user input interfaces. Instructions to control circuitry 204 may be transmitted through I/O path 202, that could consist of a video tracking and detection mechanism, Internet of Things (IoT) and home automation triggers, emergency alert systems, and software or hardware communication pipelines and/or notification centers.

Display 212 may be provided as a stand-alone device or integrated with other elements of each one of user equipment device 200. For example, display 212 may be a touchscreen or touch-sensitive display, a projector, or a casting device. In such circumstances, user input interface 210 may be integrated with or combined with display 212. Display 212 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 212. In some embodiments, the graphics processing circuitry may be external to processing circuitry 206 (e.g., as a graphics processing card that communicates with processing circuitry 206 via I/O path 202) or may be internal to processing circuitry 206 or control circuitry 204 (e.g., on a same silicone die as control circuitry 204 or processing circuitry 206). In some embodiments, the graphics processing circuitry may be used to receive, display, and play content item.

Speakers 214 may be provided as integrated with other elements of user equipment device 200 or may be stand-alone units. The audio component of videos and other content item displayed on display 212 may be played through speakers 214. In some embodiments, the audio may be distributed to a receiver (not shown), which processes and outputs the audio via speakers 214. The speakers 214 may be part of, but not limited to, a home automation system.

The media application may be implemented using any suitable architecture. For example, it may be a stand-alone application wholly implemented on user equipment device 200. The user interface application and/or any instructions for performing any of the embodiments discussed herein may be encoded on computer-readable media. Computer-readable media includes any media capable of storing data.

Figure 3:
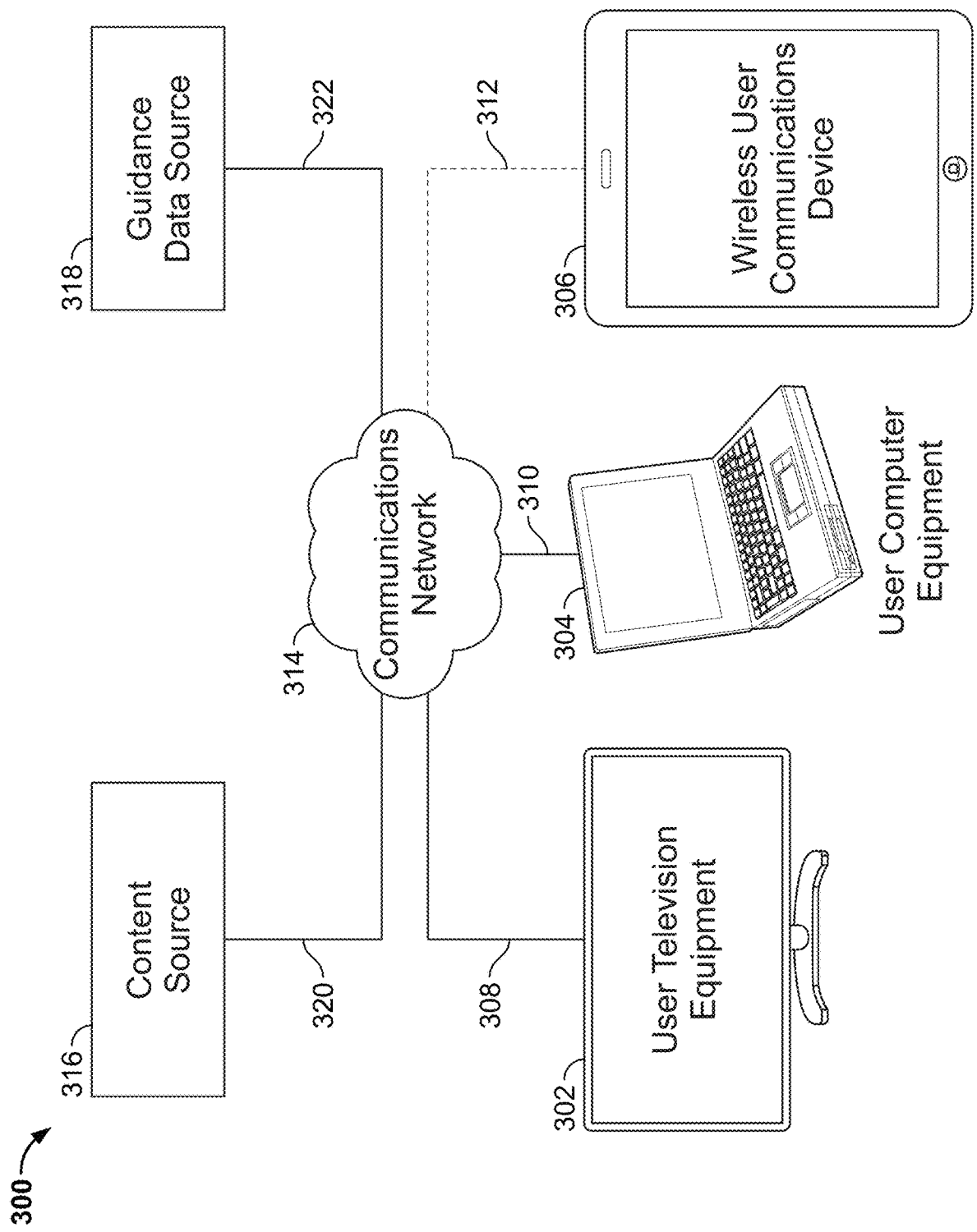
FIG. 3 is a block diagram of an illustrative user equipment device, in accordance with some embodiments of the disclosure.

FIG. 3 depicts an exemplary media system in accordance with some embodiments of the disclosure in which user equipment device 102 and user equipment device 200 can be implemented in system 300 of FIG. 3 as user television equipment 302, user computer equipment 304, wireless user communications device 306, or any other type of user equipment suitable for accessing media. For simplicity, these devices may be referred to herein collectively as user equipment. User equipment, on which the media application is implemented, may function as a stand-alone device or may be part of a network of devices. Various network configurations of devices may be implemented and are discussed in more detail below.

User television equipment 302 may include a set-top box, an integrated receiver decoder (IRD) for handling satellite television, a television set, a digital storage device, or other user television equipment. One or more of these devices may be integrated to be a single device, if desired. User computer equipment 304 may include a PC, a laptop, a streaming content item aggregator, a PC media center, or other user computer equipment. It may include devices like digital assistance, smart speakers, and/or home automation. Wireless user communications device 306 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 300, there is typically more than one of each type of user equipment but only one of each is shown in FIG. 3 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 314. Namely, user television equipment 302, user computer equipment 304, and wireless user communications device 306 are coupled to communications network 314 via communications paths 308, 310, and 312, respectively. Communications network 314 is used by the user equipment to obtain the interactive content item. Communications network 314 may be one or more networks including the Internet, a mobile phone network, ad-hoc network, a Local Area network (LAN), or other types of communications network or combination of communications networks. Paths 308, 310, and 312 may separately or together include one or more communications paths, including any suitable wireless communications path. Paths 308 and 310 are drawn as solid lines to indicate they are wireless paths and path 312 is drawn as dotted line to indicate it is a wired path. Communications with the user equipment may be provided by one or more of these communications paths but are shown as a single path in FIG. 3 to avoid overcomplicating the drawing. The user equipment devices may communicate with each other directly through an indirect path via communications network 314.

System 300 includes content item source 316 and guidance data source 318 coupled to communications network 314 via communications paths 320 and 322, respectively. Paths 320 and 322 may include any of the communications paths described above in connection with paths 308, 310, and 312. Communications with the content item source 316 and guidance data source 318 may be exchanged over one or more communications paths but are shown as a single path in FIG. 3 to avoid overcomplicating the drawing. In addition, there may be more than one of each of content item source 316 and guidance data source 318, but only one of each is shown in FIG. 3 to avoid overcomplicating the drawing. In some embodiments, content item source 316 and guidance data source 318 are integrated as one source device. Although communications between sources 316 and 318 with user equipment 302, 304, and 306 are shown as through communications network 314, in some embodiments, sources 316 and 318 may communicate directly with user equipment devices 302, 304, and 306 via communications paths (not shown) such as those described above in connection with paths 308, 310, and 312.

Content item source 316 may include one or more types of media distribution equipment such as a media server, cable system headend, satellite distribution facility, intermediate distribution facilities and/or servers, Internet providers, on-demand media servers, and other media providers. Content item source 316 may be the originator of media content item or may not be the originator of media content item. Content item source 316 may also include a remote media server used to store different types of media content item (including a media asset selected by a user), in a location remote from any of the user equipment. Systems and methods for providing remotely stored media to user equipment are discussed in greater detail in connection with Ellis et al., U.S. patent application Ser. No. 09/332,244, filed Jun. 11, 1999, which is hereby incorporated by reference herein in its entirety.

Guidance data source 318 may provide media guidance data, such as the content item information discussed above in relation to FIG. 1 or any other data related to a media asset or profile of a user. Guidance data may be provided to the user equipment using any suitable approach such as via a data feed or by querying a database of guidance data source 318. For example, control circuitry 204 may transmit a query to a database of guidance data source 318 comprising a command to retrieve metadata and an identifier uniquely representing a media asset. In response to transmitting the query, control circuitry 204 may receive a response from the database comprising metadata for the media asset uniquely represented by the identifier.

System 300 is intended to illustrate a number of approaches, or network configurations, by which user equipment devices and sources of media content item and guidance data may communicate with each other for the purpose of accessing media and data related to the media. The configuration of the devices and paths in system 300 may change without departing from the scope of the present disclosure.

Figure 4:
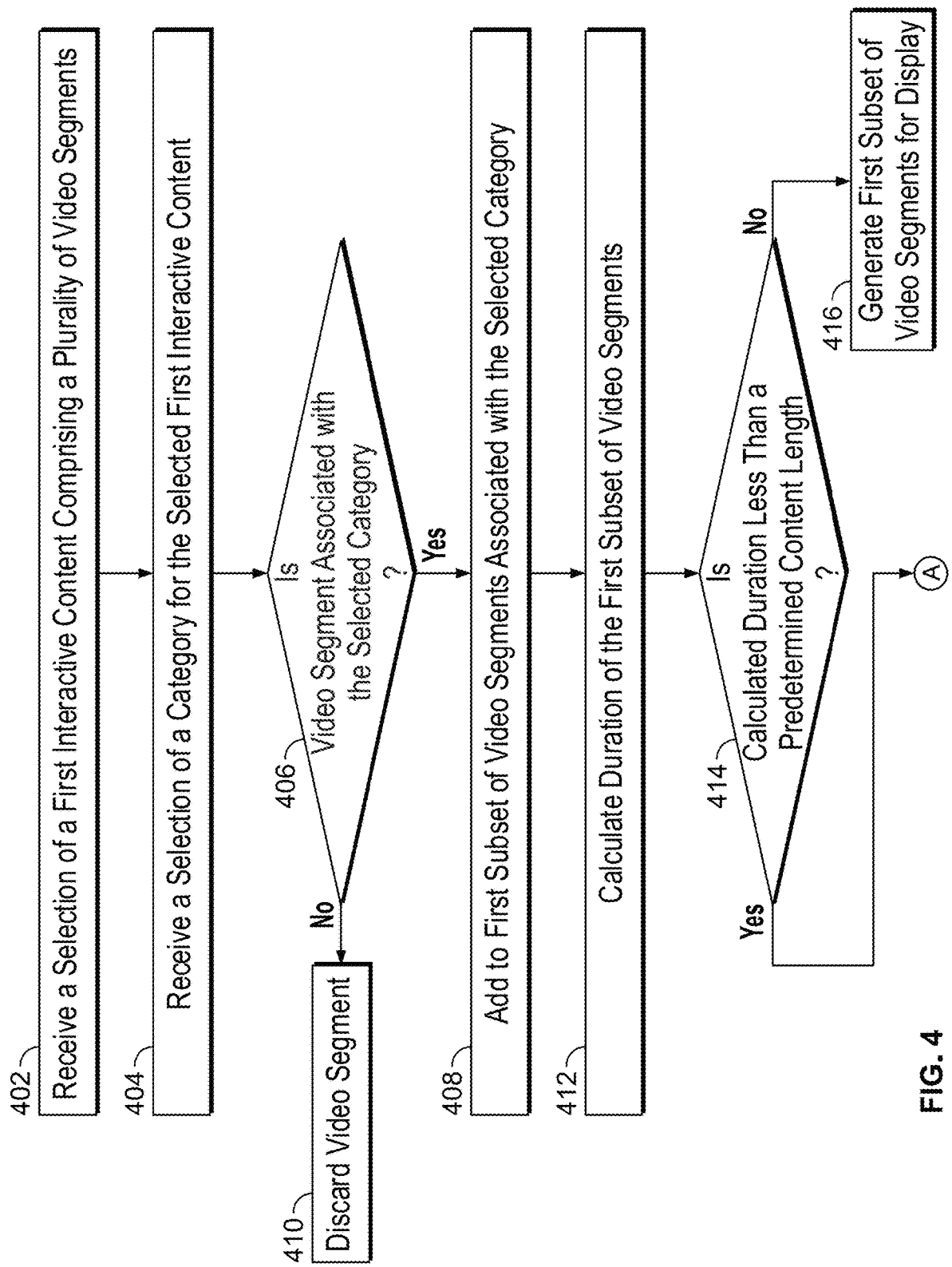
FIG. 4 shows a flowchart of an illustrative process for generating a combined interactive content item, in accordance with some embodiments of the disclosure.
Figure 4:
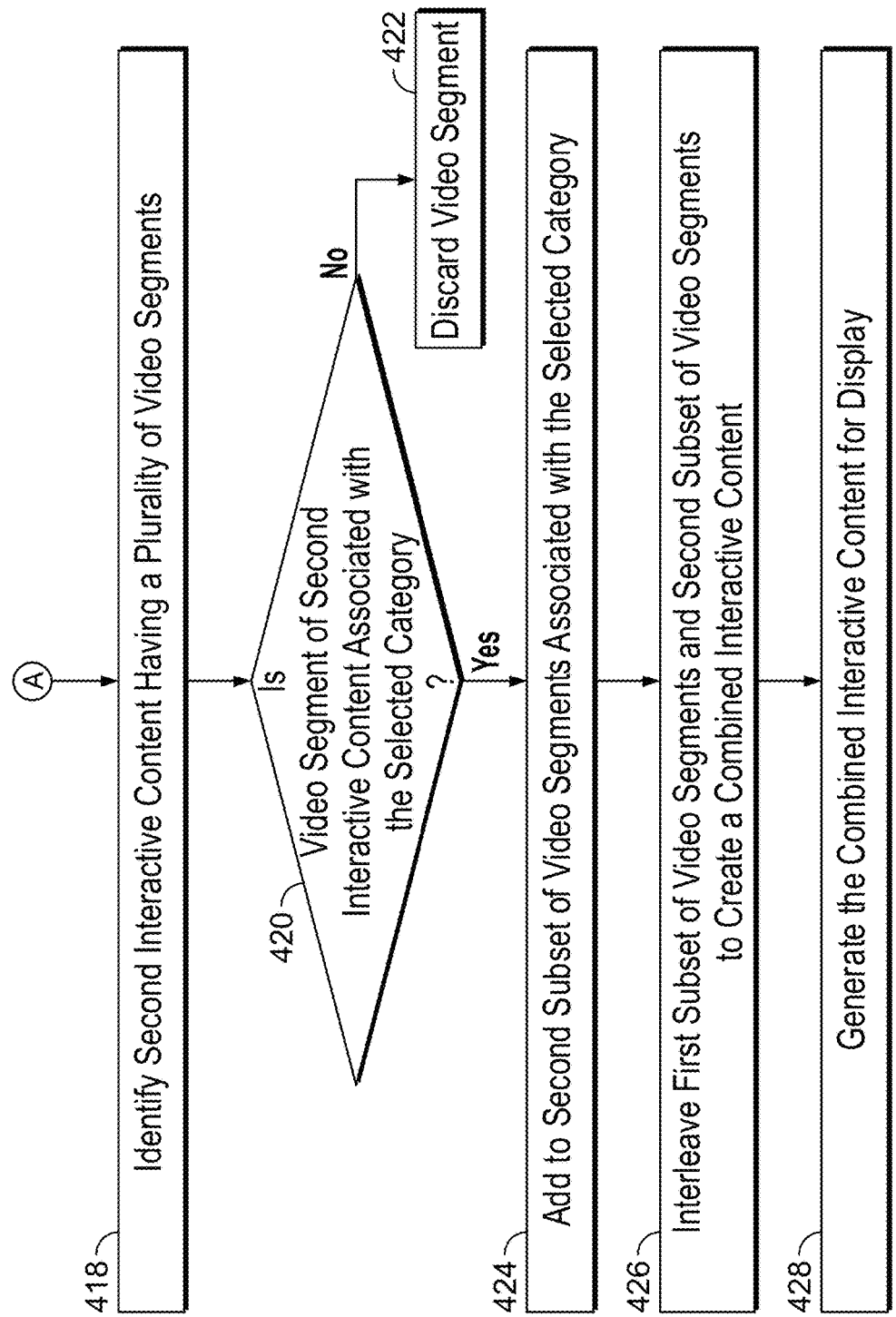

FIG. 4 is a flowchart of an illustrative process 400 for generating a combined interactive content item, in accordance with some embodiments of the disclosure. Process 400 begins at 402, where the system receives a selection of a first interactive content item comprising a plurality of scenes. For example, the system receives a selection of interactive content item 104-5 comprising of video segments 108-1-108-N.

At 404, the system receives a selection of a category for the selected first interactive content item. For example, user 101 selects the storyline directed to the "Comedy" genre for the show "Bandersnatch." At 406, the system analyzes each of the scenes of the selected first interactive content item to determine whether the respective scene is associated with the selected category. For example, the system analyzes each of video segments 108-1-108-N of interactive content item 104-5 to identify video segments that are associated with the "Comedy" genre.

If a video segment is determined to match the user-selected category, the process 400 proceeds to 408 and the video segment is added to a first subset of video segments associated with the selected category. For example, the system analyzes video segment 108-1 and determines that the video segment is associated with the "Comedy" genre. The process then proceeds to 408 and video segment 108-1 is added to the first subset of video segments associated with the genre "Comedy."

If, on the other hand, the video segment is determined not to match the user-selected category, the process 400 proceeds to 410 and the video segment is discarded. For example, the system analyzes video segment 108-2 and determines that the video segment is not associated with the "Comedy" genre. The process then proceeds to 410 and video segment 108-2 is discarded. Additional details about the process for identifying segments associated with the selected category are provided below in greater detail in connection with discussion of FIG. 6.

Next, at 412, the system calculates a total duration of the video segments in the first subset of the first interactive content item. For example, the system calculates a total duration of the first subset of video segments corresponding to the genre of "Comedy" to be 25 minutes (video segments 108-1 (2 minutes), 108-4 (7 minutes), 108-5 (8 minutes), 108- . . . (2 minutes), and 108-N-1 (6 minutes)). At 414, the system determines whether the calculated duration is less than a predetermined content item length. For example, in some implementations, the system may review the user's schedule and determine that the user 101 has approximately 30 minutes to watch the interactive content item. The system then compares the predetermined content item length (i.e., 30 minutes) to the duration of video segments 108-1, 108-4, 108-5, 108- . . . , and 108-N-1 comprising the first subset of video segments of the first interactive content item (i.e., 25 minutes).

If, at 414, the system determines that the duration of the first subset of video segments of the first interactive content item exceeds the predetermined content item length, the process 400 proceeds to 416 and the first interactive content item is generated for display. For example, if the duration of the storyline corresponding to the "Comedy" genre of the show "Bandersnatch" exceeds 30 minutes, the system will generate the storyline as is on first user equipment device 102.

If, on the other hand, at 414, the system determines that the duration of the first subset of video segments of the first interactive content item exceeds the predetermined content item length, the process 400 proceeds to 418 and the system identifies a second interactive content item having a plurality of video segments. For example, when the storyline corresponding to the "Comedy" genre for user-selected interactive content item 104-5 is determined to have a duration less than the desired predetermined content item duration, the system selects a second interactive content item (i.e., interactive content item 104-7) having a plurality of video segments 106-1-106-M.

At 420, the system analyzes each segment of the second interactive content item to determine whether the respective segment is associated with the user-selected category. For example, the system analyzes the system analyzes each of video segments 106-1-106-M of interactive content item 104-7 to identify a second subset of video segments that are associated with the "Comedy" genre.

If a video segment is determined to match the user-selected category, the process 400 proceeds to 424 and the video segment is added to a second subset of video segments associated with the selected category. For example, the system analyses video segment 106-1 and determines that the video segment is associated with the "Comedy" genre.

The process then proceeds to 424 and video segment 106-1 is added to the second subset of video segments associated with the genre "Comedy."

If, on the other hand, the video segment is determined not to match the user-selected category, the process 400 proceeds to 422 and the video segment is discarded. For example, the system analyzes video segment 106-2 and determines that the video segment is not associated with the "Comedy" genre. The process then proceeds to 422 and video segment 106-2 is discarded. Accordingly, the system identifies a second subset of video segments from the second interactive content item (i.e., video segments 106-1, 106-M-1, and 106-M of interactive content item 104-7), which match the user-selected category (i.e., the genre "Comedy").

At 426, the system interleaves the first subset of video segments and the second subset of video segments to create a combined interactive content item. For example, the system interleaves the second subset of video segments (i.e., video segments 106-1, 106-M-1, and 106-M of interactive content item 104-7) with the first subset of video segments (i.e., video segments 108-1, 108-4, 108-5, 108- . . . , and 108-N-1 of first interactive content item 104-5) in order to generate a combined interactive content item 110 which has a total duration matching the desired predetermined duration. Specifically, the system selects video segments 106-1 and 106-M from the second interactive content item 104-7, which have a total duration of 5 minutes, to be interleaved with the first subset of video segments (i.e., video segments 108-1, 108-4, 108-5, 108- . . . , and 108-N-1 of first interactive content item 104-5) that have a duration of 25 minutes for a total combined duration of 30 minutes.

At 428, the combined interactive content item is generated for display. For example, the combined interactive content item 110 is then generated for display on user equipment device 102 for user 101. In this manner, the system is able to present to user 101 an interactive content item matching the user-selected category for a desired duration.

Figure 5:
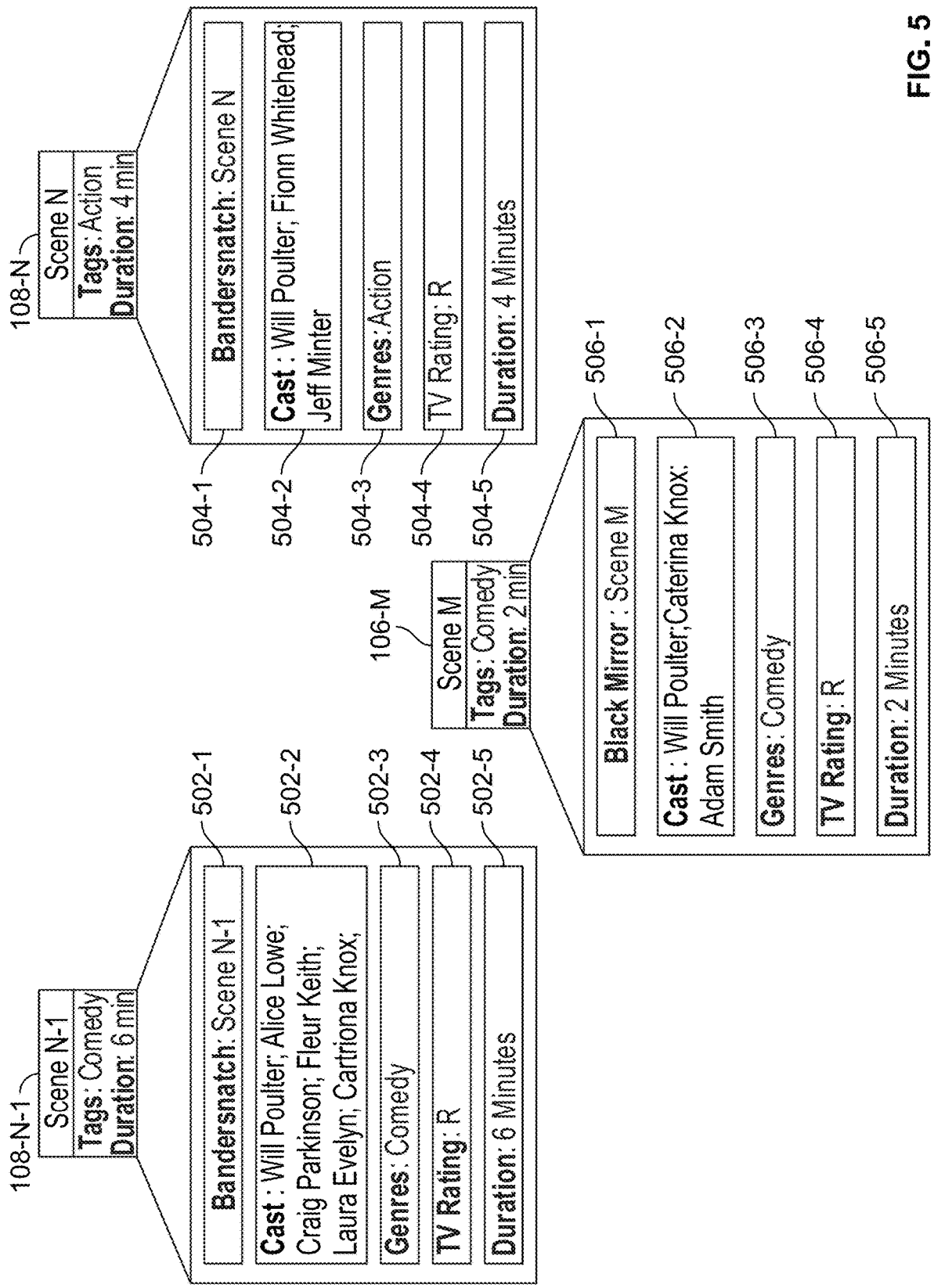
FIG. 5 shows an example of an illustrative data structure for video segment metadata, in accordance with some embodiments of the disclosure.

FIG. 5 shows an example of an illustrative data structure for video segment metadata, in accordance with some embodiments of the disclosure. Specifically, FIG. 5 shows the data structure for video segment metadata corresponding to video segments 108-N-1 and 108-N of first interactive content item 104-5 and video segment 106-M of second interactive content item 104-7. As illustrated in FIG. 5, metadata related to video segment 108-N-1 includes title of scene 502-1 (e.g., Bandersnatch, scene N-1), cast 502-2 featured in the scene (e.g., Alice Lowe, Craig Parkinson, Fleur Keith, Laura Evelyn, Catriona Knox), genre 502-3 (e.g., Comedy), content item rating 502-4 (e.g., R rating), and duration 502-5 (e.g., 6 minutes). A person skilled in the art will understand that any amount of additional metadata may be stored for each scene and that the above examples are merely for illustrative purposes. Similarly, as further illustrated in FIG. 5, metadata related to video segment 108-N includes title of scene 504-1 (e.g., Bandersnatch, scene N), cast 504-2 featured in the scene (e.g., Will Poulter, Fionn Westhead, Jeff Minter), genre 504-3 (e.g., Action), content item rating 504-4 (e.g., R rating), and duration 504-5 (e.g., 4 minutes). Metadata related to video segment 106-M includes title of scene 506-1 (e.g., Black Mirror, scene M), cast 506-2 featured in the scene (e.g., Will Poulter, Catriona Knox, Adam Smith), genre 506-3 (e.g., Comedy), content item rating 506-4 (e.g., R rating), and duration 506-5 (e.g., 2 minutes). The system stores similar metadata for each video segment of each of the plurality of interactive content items 104.

Figure 6:
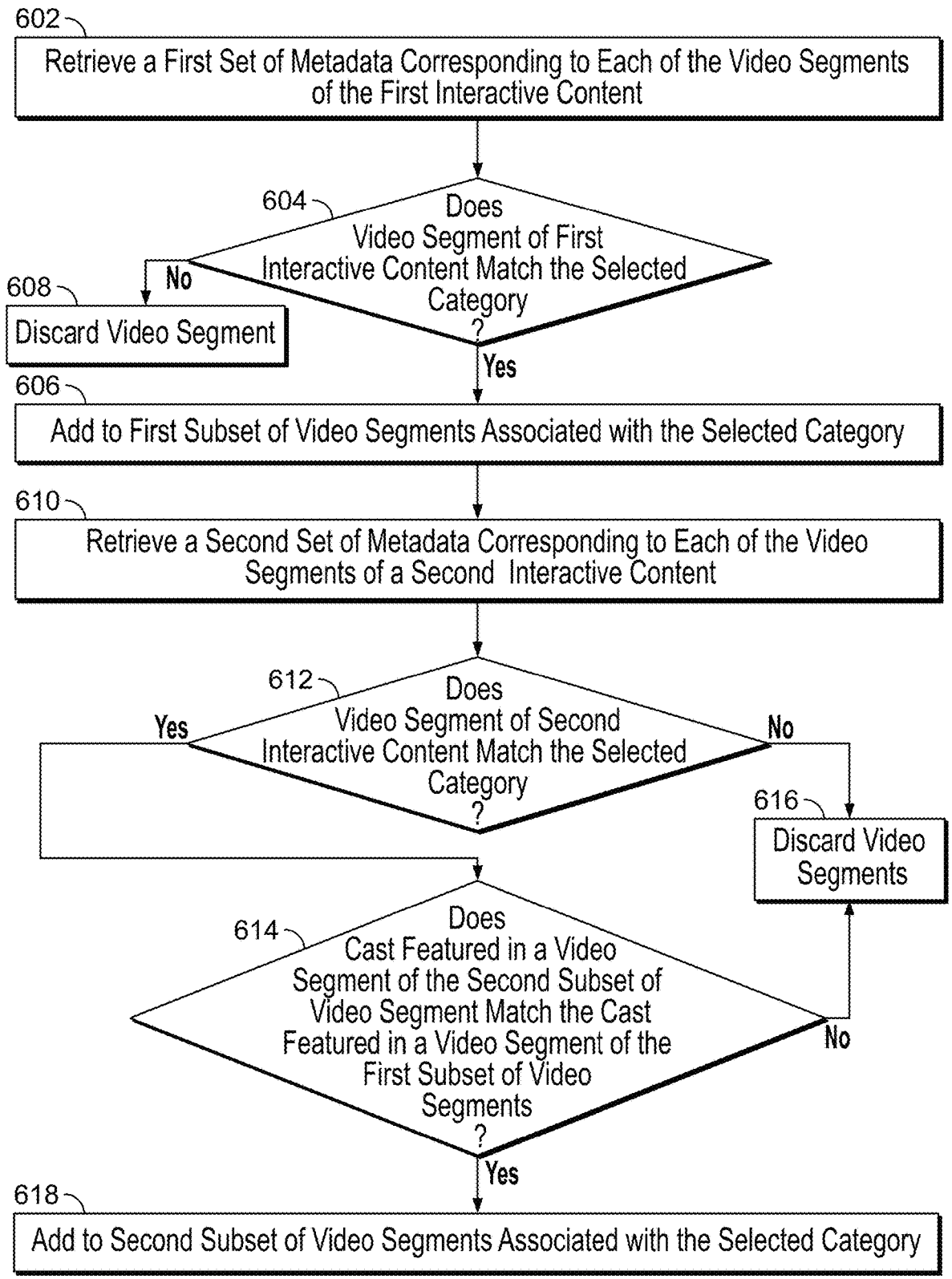
FIG. 6 shows a flowchart of an illustrative process for identifying a second subset of video segments of a second interactive content item to be interleaved with a first interactive content item, in accordance with some embodiments of the disclosure.

FIG. 6 shows a flowchart of an illustrative process 600 for identifying a second subset of video segments of a second interactive content item to be interleaved with a first interactive content item, in accordance with some embodiments of the disclosure. Process 600 begins at 602 where the system retrieves a first set of metadata corresponding to each of the video segments of the first interactive content item. For example, the system retrieves metadata related to video segment 108-N-1 that includes title of scene 502-1 (e.g., Bandersnatch, scene N-1), cast 502-2 featured in the scene (e.g., Alice Lowe, Craig Parkinson, Fleur Keith, Laura Evelyn, Catriona Knox), genre 502-3 (e.g., Comedy), content item rating 502-4 (e.g., R rating), and duration 502-5 (e.g., 6 minutes) as illustrated in FIG. 5.

At 604, the system analyzes each of the scenes of the selected first interactive content item to determine whether the respective scene is associated with the selected category. For example, the system analyzes each of video segments 108-1-108-N of interactive content item 104-5 to identify video segments that are associated with the "Comedy" genre.

If a video segment is determined to match the user-selected category, the process 600 proceeds to 606 and the video segment is added to a first subset of video segments associated with the selected category. For example, the system analyzes video segment 108-1 and determines that the video segment is associated with the "Comedy" genre. The process then proceeds to 606 and video segment 108-1 is added to the first subset of video segments associated with the genre "Comedy."

If, on the other hand, the video segment is determined not to match the user-selected category, the process 600 proceeds to 608 and the video segment is discarded. For example, the system analyses video segment 108-2 and determines that the video segment is not associated with the "Comedy" genre. The process then proceeds to 608 and video segment 108-2 is discarded.

Next, at 610, the system retrieves a second set of metadata corresponding to each of the video segments of the first interactive content item. For example, the system retrieves metadata such as title of scene 506-1 (e.g., Black Mirror, scene M), cast 506-2 featured in the scene (e.g., Will Poulter, Catriona Knox, Adam Smith), genre 506-3 (e.g., Comedy), content item rating 506-4 (e.g., R rating), and duration 506-5 (e.g., 2 minutes) as illustrated in FIG. 5.

At 612, the system analyzes each of the scenes of the second interactive content item to determine whether the respective scene is associated with the selected category. For example, the system analyzes each of video segments 106-1-106-M of interactive content item 104-7 to identify video segments that are associated with the "Comedy" genre.

If a video segment is determined to match the user-selected category, the process 600 proceeds to 614 where the video segment is further analyzed to determine whether the cast featured in the video segment matches the cast featured in a video segment of the first subset of video segments belonging to the first interactive content item. For example, the system analyses video segment 106-1 and determines that the video segment is associated with the "Comedy" genre. If, on the other hand, the video segment is determined not to match the user-selected category, the process 600 proceeds to 616 and the video segment is discarded. For example, the system analyzes video segment 106-2 and determines that the video segment is not associated with the "Comedy" genre. The process then proceeds to 616 and video segment 106-2 is discarded.

At 614, video segment 106-1 is further analyzed to determine whether the cast featured in video segment 106-1 (based on retrieved metadata as shown in FIG. 5) matches the cast featured in one or more of video segments 108-1, 108-4, 108-5, 108- . . . , and 108-N-1 (i.e., video segments forming the first subset of the first interactive content item). For example, the system identifies cast members "Will Poulter" and "Caterina Knox" as being featured in both video segment 106-M of second interactive content item 104-7 and video segment 108-N-1 of first interactive content item 104-5.

If the video segment is determined to feature cast members who are also featured in a video segment of the first subset of video segments from the first interactive content item, the process 600 proceeds to 618 and the video segment is added to a second subset of video segments from the second interactive content item. For example, upon determining that cast members "Will Poulter" and "Caterina Knox" are featured in both video segment 106-M of second interactive content item 104-7 and video segment 108-N-1 of first interactive content item 104-5, video segment 106-M is added to the second subset of video segments.

If, on the other hand, it is determined that the video segment of the second interactive content item does not feature cast members who are also featured in a video segment of the first subset of video segments from the first interactive content item, the process 600 proceeds to 616 and the video segment is discarded. For example, when the system determines that video segment 106-M-1 features cast members who are not featured in any of video segments 108-1, 108-4, 108-5, 108- . . . , and 108-N-1 (i.e., first subset of video segments), video segment 106-M-1 is discarded, even though the video segment is associated with the "Comedy" genre. In this way, the system ensures that the combined interactive content item features cast members across multiple scenes, therefore improving the viewing experience and creating a more coherent combined storyline.

Figure 7:
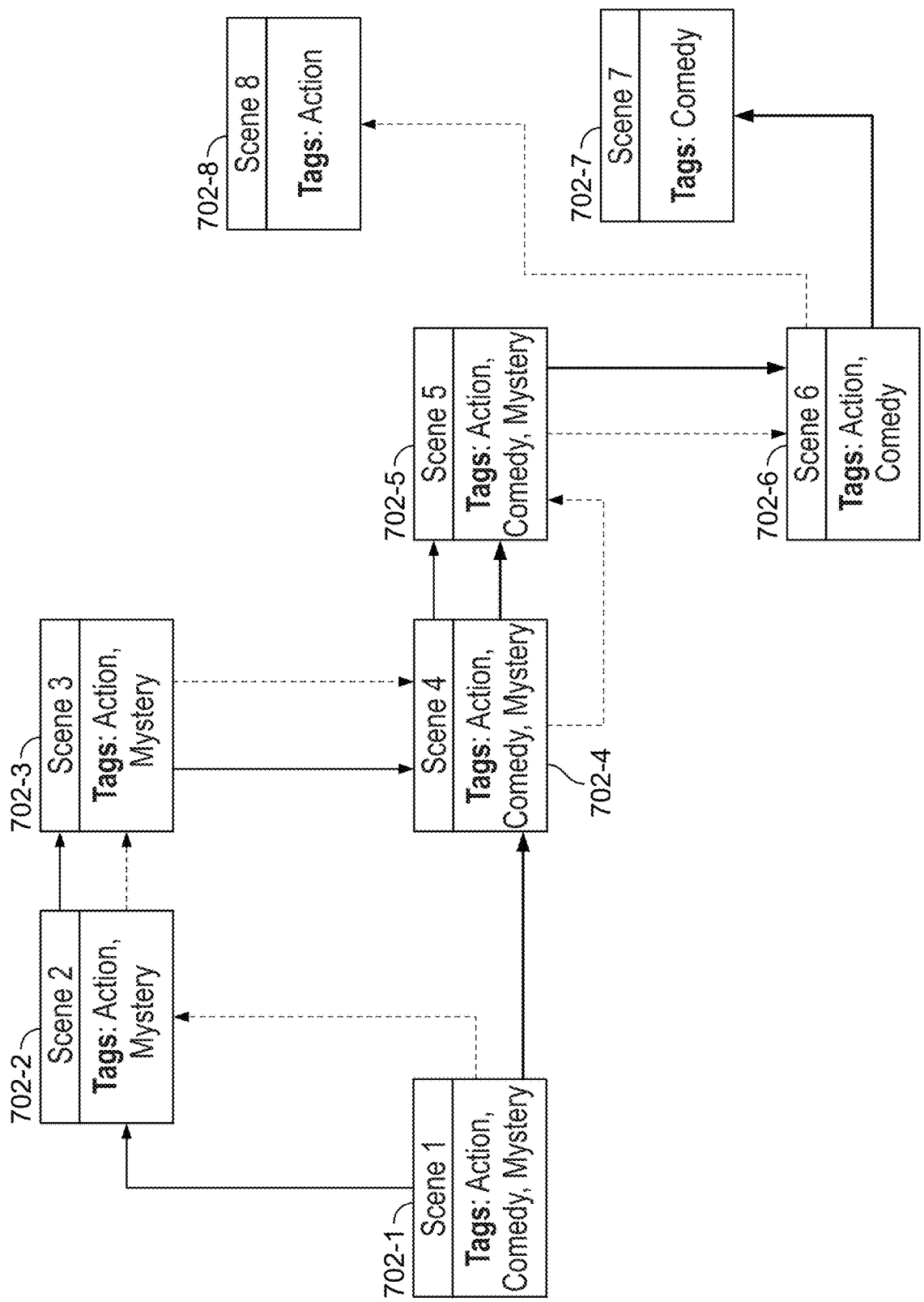
FIG. 7 is a schematic illustration of arranging scenes of an interactive content item to correspond to different storylines based on a user-selected category, in accordance with some embodiments of the disclosure.

FIG. 7 is a schematic illustration of arranging scenes of an interactive content item to correspond to different storylines based on user-selected category, in accordance with some embodiments of the disclosure. As illustrated in FIG. 7, interactive content item 700 comprises of a plurality of video segments 702-1-702-8. Video segments 702-1-702-8 may be of varying durations and correspond to different scenes of the first interactive content item. As further shown in FIG. 7, each of video segments 702-1-702-8 has one or more category tags associated with it. For instance, scene 1 (video segment 702-1) is associated with the following category tags: Action, Comedy, and Mystery. Similarly, scene 2 (video segment 702-2) is associated with the following category tags: Action and Mystery. A person skilled in the art will understand that any number of category tags may be applied to each of the video segments, and that the listed category tags are for illustrative purposes only.

In some implementations, the system arranges the scenes of the first interactive content item based on the associated category tags. For instance, a storyline corresponding to the "Comedy" genre will comprise scene 1 (video segment 702-1), scene 4 (video segment 702-4), scene 5 (video segment 702-5), scene 6 (video segment 702-6), and scene 7 (video segment 702-7) and is arranged in the order illustrated by the bolded line. Similarly, a storyline corresponding to the "Action" genre will comprise scene 1 (video segment 702-1), scene 2 (video segment 702-2), scene 3 (video segment 702-3), scene 4 (video segment 702-4), scene 5 (video segment 702-5), scene 6 (video segment 702-6), and scene 8 (video segment 702-8) and is arranged in the order illustrated by the dotted line. Finally, a storyline corresponding to the "Mystery" genre will comprise scene 1 (video segment 702-1), scene 2 (video segment 702-2), scene 3 (video segment 702-3), scene 4 (video segment 702-4), and scene 5 (video segment 702-5), and is arranged in the order illustrated by the thin line.

Figure 8:
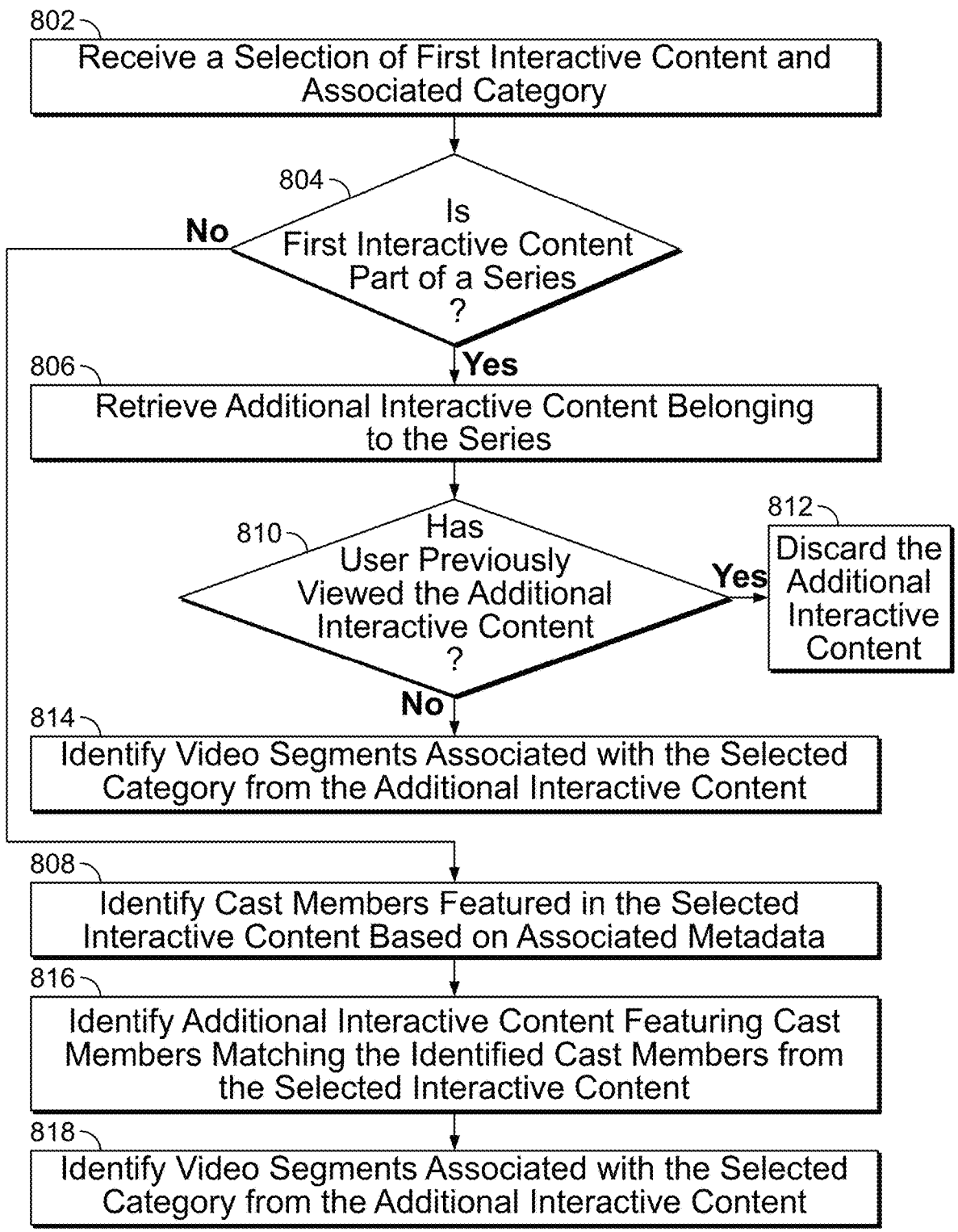
FIG. 8 shows a flowchart of an illustrative process for identifying a second interactive content item, in accordance with some embodiments of the disclosure.

FIG. 8 shows a flowchart of an illustrative process 800 for identifying a second interactive content item, in accordance with some embodiments of the disclosure. The process 800 begins at 802 where the system receives a selection of a first interactive system and an associated category. For example, the system receives a selection of first interactive content item 104-5 (i.e., "Bandersnatch" with the storyline being directed to the "Comedy" genre).

At 804, the system determines whether the selected first interactive content item is part of a series. For example, the system determines whether the selected show "Bandersnatch" is part of a series. If so (YES at 804), the process 800 proceeds to 806 and the system retrieves additional interactive content items belonging to the series to which the first interactive content item also belongs. For example, in response to determining that the selected show "Bandersnatch" is part of a series titled "Black Mirror," the system retrieves another episode of the series (i.e., second interactive content item 104-7).

At 810, the system determines whether the user has previously viewed the retrieved additional interactive content item. For example, the system retrieves a media consumption history of the user selecting the first interactive content item to determine whether the user has previously viewed additional episodes of the show "Black Mirror." If so (YES at 810), the process 800 proceeds to 812 and the additional interactive content items are discarded. If, on the other hand, the system determines that the user has not previously viewed the retrieved additional interactive content item (NO at 810), process 800 proceeds to 814 and the system identifies video segments from the retrieved additional interactive content items that match the selected category using, for example, process 600 discussed above.

If, on the other hand, the system determines that the selected show is not part of a series (i.e., NO at 804), the process 800 proceeds to 808 where the system identifies cast members featured in the selected first interactive content item based on associated metadata (see, e.g., the discussion associated with FIG. 5 above for additional details regarding metadata). At 816, the system identifies additional interactive content items featuring cast members who match the identified cast members featured in the selected first interactive content item based on associated metadata. At 818, the system identifies video segments from the retrieved additional interactive content items that match the selected category using, for example, process 600 discussed above.

A person skilled in the art will understand that processes 400 (comprising steps 402-428), 600 (comprising steps 602-618), and 800 (comprising steps 802-818) may be performed in combination with any other subroutines or performed by themselves. The processes 400, 600, and 800 may be performed by, for example, control circuitry 204 as described above.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, processes 400, 600, and 800 can be performed on any of the devices shown in FIGS. 1-3. Additionally, any of the steps in processes 400, 600, and 800 can be performed in any order, can be omitted, and/or can be combined with any of the steps from any other process.

While some portions of this disclosure may refer to "convention," any such reference is merely for the purpose of providing context to the invention(s) of the instant disclosure, and does not form any admission as to what constitutes the state of the art.

What is claimed is:

1. A method comprising:
   receiving a selection of a first content item;
   receiving a selection of a keyword;
   identifying scenes from the first content item that match the selected keyword;
   extracting identified scenes from the first content item; and
   in response to determining that a length of the extracted scenes is below a threshold length of time available for viewing associated with a user profile related to the selection of the first content item;
      retrieving a first set of metadata corresponding to extracted scenes from the first content item;
      identifying a second content item based on at least one of matching a second set of metadata corresponding to the second content item with the first set of metadata or matching the second set of metadata with the selected keyword;
      identifying scenes from the second content item that match the selected keyword;
      extracting identified scenes from the second content item;
      combining the extracted scenes from the first content item and the extracted scenes from the second content item; and
      generating for output the combined content item.

2. The method of claim 1, wherein the first content item and the second content item are part of a series of sequentially ordered items.

3. The method of claim 1, further comprising:
   arranging each of the scenes from the first content item and the scenes from the second content item in a sequence to create a storyline matching the selected keyword.

4. The method of claim 1, further comprising:
   receiving first metadata of the first content item; and
   identifying the second content item having second metadata matching the first metadata of the first content item.

5. The method of claim 1, further comprising:
   receiving second metadata of the second content item;
   based on the second metadata, determining tag information indicative of a category with which each scene of the second content item is associated; and
   based on the received metadata, identifying the scenes that match the selected keyword.

6. The method of claim 5, further comprising:
   presenting for a selection a list of categories from the determined tag information.

7. The method of claim 1, further comprising:
   identifying a first list of actors included in the scenes from the first content item;
   identifying a second list of actors included in the scenes from the second content item; and
   in response to determining an overlap between the first list of actors included in the scenes from the first content item and the second list of actors included in the scenes from the second content item:
      arranging the scenes of the first content item adjacent to the scenes of the second content item.

8. The method of claim 1, further comprising:
   in response to determining that a length of the extracted scenes exceeds a threshold length:
      generating for output the extracted scenes from the first content item that match the keyword.

9. The method of claim 1, wherein the first metadata of the first content item comprises at least one of cast information, genre information, ratings information, and duration information.

10. A system comprising:
    control circuitry configured to:
    receive a selection of a first content item;
    receive a selection of a keyword;
    identify scenes from the first content item that match the selected keyword;
    extract identified scenes from the first content item; and
    in response to determining that a length of the extracted scenes is below a threshold length of time available for viewing associated with a user profile related to the selection of the first content item;
       retrieve a first set of metadata corresponding to extracted scenes from the first content item;
       identify a second content item based on at least one of matching a second set of metadata corresponding to the second content item with the first set of metadata or matching the second set of metadata with the selected keyword;
       identify scenes from the second content item that match the selected keyword;
       extract identified scenes from the second content item; and
       combine the extracted scenes from the first content item and the extracted scenes from the second content item; and input/output circuitry configured to:
generate for output the combined content item.

11. The system of claim 10, wherein the first content item and the second content item are part of a series of sequentially ordered items.

12. The system of claim 10, wherein the control circuitry is further configured to:
arrange each of the scenes from the first content item and the scenes from the second content item in a sequence to create a storyline matching the selected keyword.

13. The system of claim 10, wherein the control circuitry is further configured to:
receive first metadata of the first content item; and
identify the second content item having second metadata matching the first metadata of the first content item.

14. The system of claim 10, wherein the control circuitry is further configured to:
receive second metadata of the second content item;
based on the second metadata, determine tag information indicative of a category with which each scene of the second content item is associated; and
based on the received metadata, identify the scenes that match the selected keyword.

15. The system of claim 14, wherein the control circuitry is further configured to:
present for a selection a list of categories from the determined tag information.

16. The system of claim 10, wherein the control circuitry is further configured to:
identify a first list of actors included in the scenes from the first content item;
identify a second list of actors included in the scenes from the second content item; and
in response to determining an overlap between the first list of actors included in the scenes from the first content item and the second list of actors included in the scenes from the second content item:
arrange the scenes of the first content item adjacent to the scenes of the second content item.

17. The system of claim 10, wherein the control circuitry is further configured to:
in response to determining that a length of the extracted scenes exceeds a threshold length:
generate for output the extracted scenes from the first content item that match the keyword.

18. The system of claim 10, wherein the first metadata of the first content item comprises at least one of cast information, genre information, ratings information, and duration information.

* * * * *